Patented July 5, 1949

2,475,068

UNITED STATES PATENT OFFICE 2,475,068

HYDROXYALKYL ALKYLENIMINES AND METHOD OF MAKING SAME

Alexander L. Wilson, Upper Montclair, N. J., assignor to Carbide and Carbon Chemicals Corporation, a corporation of New York No Drawing. Application March 25, 1944, Serial No. 528,169

11 Claims. (Cl. 260—239)

1

The present invention relates to N-(2-hydroxyalkyl) 1,2-alkylenimines and to a method of making them from 1,2-alkylenimines and alkylene oxides, as in the formation of N-(2-hydroxypropyl)ethylenimine,

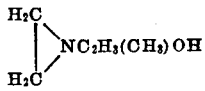

from ethylenimine and propylene oxide.

It has been proposed to react alkylenimines with alkylene oxides to form viscous to waxy condensation products. As far as is known such products are mixtures of compounds of relatively high molecular weight which are unresolvable into identifiable constituents.

The new compounds of this invention may be represented by the general formula:

$$R^1:N \cdot R^2OH$$

in which $R^1$ and $R^2$ each stand for a lower 1,2-alkylene group or radical. These compounds are characterized by the presence therein of a tertiary amino nitrogen atom, :N·, which is present in a 1,2-alkylene ring, that is, a three membered ring in which the nitrogen atom is attached to adjacent carbon atoms of an alkylene group. The compounds also contain an alcoholic hydroxyl group, with the nitrogen atom and the hydroxyl group attached to adjacent carbons of a second alkylene group which may or may not be similar to the alkylene group of the ring.

Specific examples of such compounds are:

$C_2H_4:NC_2H_4OH$, N-(2-hydroxyethyl)ethylenimine
$(CH_3)C_2H_3:NC_2H_4OH$, N-(2-hydroxyethyl)1,2-propylenimine
$(CH_3)_2C_2H_2:NC_2H_4OH$, N-(2-hydroxyethyl)2,3-butylenimine
$C_2H_4:NC_2H_3(CH_3)OH$, N-(2-hydroxyproyl)ethylenimine
$(CH_3)C_2H_3:NC_2H_3(CH_3)OH$, N-(2-hydroxypropyl)1,2-propylenimine Imines which are suitable for making the new compounds are the lower,1,2-alkylenimines which are water-soluble and in which the nitrogen atom, and at least one of the carbon atoms adjacent the nitrogen atom have a hydrogen atom attached thereto.

By 1,2-alkylenimines is meant those imines in which the nitrogen atom is attached to adjacent carbon atoms thereof. The 1,2-alkylenimines having more than six carbon atoms to the molecule are, for the most part, soluble in water only to a limited degree if at all. Preferred imines are ethylenimine; 1,2-propylenimine; 1,2-butylenimine and 2,3-butylenimine.

Alkylene oxides which are suitable for making the new compounds are the lower 1,2-alkylene oxides which are water-soluble, and in which at least one of the carbon atoms adjacent the oxygen atom has a hydrogen atom attached thereto. By 1,2-alkylene oxide is meant those alkylene oxides in which the oxygen atom is attached to adjacent carbon atoms thereof. The 1,2-alkylene oxides having more than six carbon atoms to the molecule are, for the most part, soluble in water to only a limited extent, if at all. Preferred 1,2-alkylene oxides are ethylene oxide; 1,2-propylene oxide; 1,2-butylene oxide, and 2,3-butylene oxide.

The reaction may be illustrated by the following general equation:

$$R^1:NH + R^2:O \rightarrow R^1:N \cdot R^2OH$$

wherein $R^1$ and $R^2$ each stand for a lower 1,2-alkylene group or radical.

The compounds are colorless, mobile liquids having an ammoniacal odor. They are useful as modifiers for nitrogen plastics and other resins and as intermediates in the preparation of their polymers. They polymerize rapidly in water, or slowly on heating in the pure state. The polymers are viscous to semi-solid products of appreciable solubility in water. The compounds undergo many of the reactions characteristic of the lower alkylenimines, for instance, addition of hydrochloric acid to yield beta-hydroxy, beta chloro dialkylamines.

The N-(2-hydroxyalkyl)1,2-alkylenimines of this invention may be made by reacting a water-soluble 1,2-alkylenimine with a lower 1,2-alkylene oxide in the presence of water, followed by the rapid separation of the reaction product from the water. In the first stage of the procedure, that is, in the formation of the compound, the reaction conditions are so selected as to favor a narrowly restricted degree of reaction, namely, a low proportion of water, a low temperature for reaction and absence of acid catalyst or the presence of alkaline inhibitor. In a second or following stage the reaction may be quenched by the removal of water, as indicated, or by the addition of an alkaline base. The desired reaction product may then be separated or recovered from the reaction mixture in a substantially anhydrous state. The preferred procedure in the latter stage of the preparation is to add to the reaction mixture a sufficient amount of an alkali metal hydroxide, for instance, sodium hydroxide, preferably in solid form, to cause the reaction mixture to separate into two liquid layers. The upper layer is then removed mechanically and dried by adding solid sodium hydroxide or other alkali metal hydroxide, or a concentrated solution thereof, and distilled.

As an alternative, the reaction product may be extracted from the reaction mixture using benzene or some other non-aqueous extractant which is nonreactive. The extraction is carried out preferably after quenching the reaction by the addition of alkali, and the product may be recovered from the resulting extract by distillation under conditions favoring the rapid removal of residual water, or in the presence of additional alkali for drying, or a combination of such expedients.

The addition of sodium hydroxide or other alkali metal hydroxide has been found most effective in quenching the polymerization reaction. It is possible that such quenching action may result from an anti-catalytic effect exerted by the alkali metal hydroxide, or by a reduction in the effective water concentration in the mixture, or both. In dilute aqueous solution of the hydroxyalkyl alkylenimine even a small proportion of sodium hydroxide markedly inhibits the polymerization, while an amount of alkali metal hydroxide sufficient to give an alkali concentration corresponding to 50 per cent by weight, based on the aqueous hydroxide solution, is effective to prevent polymerization, substantially completely.

In carrying out the reaction it is usually undesirable to allow the temperature of the reaction mixture to rise much above 55° to 75° C. At a temperature from about 0° C. to 55° C. the reaction may be carried out at a suitable rate without excessive polymerization, and this range is preferred.

The invention may be illustrated further by the following examples:

*Example 1*

C₂H₄:NC₂H₄OH

N-(2-hydroxyethyl)ethylenimine

Into a reaction vessel maintained at a temperature of about 10° C. were charged 43 parts of ethylenimine (1 mol), 44 parts of ethylene oxide (1 mol) and 20 parts of water, all by weight. The resulting solution was stirred and maintained at a temperature of 10° to 20° C. for a period of about four hours. Flaked sodium hydroxide (20 parts) was then added to the reaction mixture. During the solution of the alkali, 21 parts of unreacted ethylene oxide were evolved; and the reaction mixture formed itself into two layers. The supernatant layer was extracted with a total of 100 milliliters of benzene. Upon distillation of the extract 0.48 mol of ethylenimine (mixed with benzene) was recovered. The residual water remaining with the product in the distillation flask was removed azeotropically, and the residue distilled, at reduced pressure, to a liquid temperature of 140° C. at an absolute pressure of 9 millimeters. Another distillation and rectification of the distillate fraction yielded 12.5 parts of N-(2-hydroxyethyl)ethylenimine distilling at a temperature of 165° to 175° C. The yield was 14.5 per cent and the efficiency, 28 per cent, based on the ethylenimine.

The properties of N-(2-hydroxyethyl) 1,2-ethylenimine were found to be as follows: boiling point, 169°-170° (corr.);

0.993; $n_D^{20}$, 1.4547; equivalent weight 87.5 (theory 87.18); mol. refraction, 23.85 (calc. 23.93).

*Example 2*

C₂H₄:NC₂H₃(CH₃)OH

N-(2-hydroxypropyl)ethylenimine

Into a reaction vessel provided with a reflux condenser were charged 21.5 parts of ethylenimine (0.5 mol), 29 parts of propylene oxide (0.5 mol) and 20 parts of water all by weight. An exothermic reaction occurred which maintained the reaction mixture at its boiling temperature of about 45° to 55° C. for a period of 45 minutes. At the end of that time 20 parts of flaked sodium hydroxide and 75 milliliters of benzene were added, and the refluxing continued by external heating for a short period. The reaction mixture was then allowed to come to rest, and settle into two layers. The upper or benzene layer was separated and distilled under a reduced pressure, and a portion which came over at a temperature of about 60° to 80° C., at a pressure of about 20 millimeters, was collected. Upon distilling this portion, there were obtained 8 parts of N-(2-hydroxypropyl)ethylenimine which was found to have the following properties: boiling point, 161°-163° C. (corr.);

0941; $n_D^{20}$, 1.4488; molecular refraction 28.81 (calc. 28.56).

The yield was 16 per cent, based on the ethylenimine.

*Example 3*

Another run similar to that of Example 2 was made with the following charge: ethylenimine, 43 parts (1 mol); propylene oxide, 58 parts (1 mol); sodium hydroxide flakes, 1 part; and water, 20 parts, all by weight.

The mixture was maintained at a temperature of about 40° to 47° C. for a period of about one hour, under reflux and the temperature then raised rapidly to 70° C. Thereupon, the reaction was quenched by the addition of 19 parts of sodium hydroxide flakes and the resulting mixture was extracted with benzene, and the extract distilled. The yield of N-(2-hydroxypropyl)-ethylenimine, boiling at 161°-163° C. (corr.), was 28 per cent, based on the ethylenimine.

*Example 4*

(CH₃)C₂H₃:NC₂H₃(CH₃)OH

N-(2-hydroxypropyl) 1,2-propylenimine

A reaction mixture containing 57 parts of 1,2-propylenimine (1 mol) 58 parts of propylene oxide (1 mol) and 20 parts of water, all by weight, was maintained at a temperature of about 40° to 50° C. for a period of about one hour, under a reflux. After the mixture had been permitted to stand over night, without heating, 20 parts by weight of flaked sodium hydroxide were added. The resulting composition was then extracted twice with benzene using, in all, 105 parts by weight of benzene. The benzene extract was distilled under reduced pressure and a portion collected which came over at a temperature from about 120° C. at 740 millimeters to 140° C. at 2 millimeters pressure. Upon redistillation of this portion there was obtained 61 parts, by weight, of N-(2-hydroxypropyl) 1,2-propylenimine which was found to have the following properties: boiling point, 159°-160° C. (corr.);

0.9266; $n_D^{20}$, 1.4430. The yield based on the propylenimine was 55 per cent.

The invention is susceptible of modification within the scope of the appended claims.

I claim:

1. A water-soluble, monomeric N-hydroxyalkyl alkylenimine of the formula

R¹:N·R²OH in which $R^1$ is a lower alkylene group of not more than four carbon atoms having adjacent carbon atoms thereof attached to the nitrogen atom, with at least one of said adjacent carbon atoms holding a hydrogen atom; and $R^2$ is an alkylene group of not more than four carbon atoms having adjacent carbon atoms thereof attached to the nitrogen atom and the hydroxyl group with at least one of said adjacent carbon atoms holding a hydrogen atom.

2. A water-soluble, monomeric N-hydroxyalkyl alkylenimine of the formula $$R^1:N\cdot R^2OH$$

in which $R^1$ is a lower alkylene group of not more than four carbon atoms having adjacent carbon atoms thereof attached to the nitrogen atom, with at least one of said adjacent carbon atoms holding a hydrogen atom; and $R^2$ is a 1,2-alkylene group of from 2 to 3 carbon atoms.

3. A water-soluble, monomeric N-hydroxyalkyl alkylenimine of the formula $$R^1:N\cdot R^2OH$$

in which $R^1$ is a 1,2-alkylene group of from 2 to 3 carbon atoms; and $R^2$ is a lower alkylene group having adjacent carbon atoms thereof attached to the nitrogen atom and the hydroxyl group with at least one of said adjacent carbon atoms holding a hydrogen atom.

4. A water-soluble, monomeric N-hydroxyalkyl alkylenimine of the formula $$R^1:N\cdot R^2OH$$

in which $R^1$ and $R^2$ are each 1,2-alkylene groups having from 2 to 3 carbon atoms to the molecule.

5. N-(2-hydroxypropyl) 1,2-propylenimine.
6. N-(2-hydroxypropyl) 1,2-ethylenimine.
7. N-(2-hydroxyethyl) ethylenimine.

8. A process for making a water soluble, monomeric N-(2-hydroxyalkyl) 1,2-alkylenimine which comprises reacting a non-acidic mixture of a water-soluble, lower alkylenimine in which the nitrogen atom is attached to adjacent carbon atoms and substantially the molar equivalent thereof of a water-soluble lower alkylene oxide in which the oxygen atom is attached to adjacent carbon atoms in the presence of a small amount of water not in excess of the amount of said alkylenimine, by weight; and, prior to the complete reaction of either the alkylenimine and the alkylene oxide, reducing the effective water concentration mixture to an amount which is insufficient to promote active polymerization.

9. A process for making a water-soluble, monomeric N-(2-hydroxyalkyl) 1,2-alkylenimine which comprises reacting a non-acidic mixture of a water-soluble lower alkylenimine in which the nitrogen atom is attached to adjacent carbon atoms and substantially the molar equivalent thereof of a water-soluble, lower alkylene oxide in which the oxygen atom is attached to adjacent carbon atoms in the presence of a small amount of water not in excess of the amount of said alkylenimine, by weight; and prior to the complete reaction of either the alkylenimine and the alkylene oxide, quenching the reaction by the addition of alkali metal hydroxide to the reaction mixture.

10. A process for making a water-soluble, monomeric N-(2-hydroxyalkyl) 1,2-alkylenimine which comprises reacting a non-acidic mixture of a water-soluble, lower alkylenimine in which the nitrogen atom is attached to adjacent carbon atoms and substantially the molar equivalent thereof of a water-soluble lower alkylene oxide in which the oxygen atom is attached to adjacent carbon atoms in the presence of a small amount of water not in excess of the amount of said alkylenimine, by weight, and at a temperature not substantially above the refluxing temperature of the mixture; and reducing the effective water concentration in the mixture to an amount which is insufficient to promote active polymerization, prior to the complete reaction of either the alkylenimine and the alkylene oxide.

11. A process for making a water-soluble, monomeric N-(2-hydroxyalkyl) alkylenimine which comprises reacting a non-acidic mixture of a 1,2-alkylenimine having from 2 to 3 carbon atoms to the molecule and substantially the molar equivalent thereof of a 1,2-alkylene oxide having from 2 to 3 carbon atoms to the molecule in the presence of a small amount of water not in excess of the amount of said alkylenimine, by weight; and, prior to the complete reaction of either the alkylenimine and the alkylene oxide, reducing the effective water concentration in the mixture to an amount which is insufficient to promote active polymerization.

ALEXANDER L. WILSON.

REFERENCES CITED

The following references are of record in the file of this patent:

UNITED STATES PATENTS

| Number | Name | Date |
|---|---|---|
| 1,799,816 | Hole | Apr. 17, 1931 |
| 2,296,225 | Ulrich | Sept. 15, 1942 |
| 2,322,073 | Thomas et al. | June 15, 1943 |

FOREIGN PATENTS

| Number | Country | Date |
|---|---|---|
| 466,344 | Great Britain | May 24, 1937 |

OTHER REFERENCES

Ellis: "The Chemistry of Synthetic Resins." vol. I, (Reinhold Publishing Co.; New York, N. Y.; 1935) pages 565, 577, and 586.

Ellis: "Chemistry of Petroleum Derivatives." vol. II. (Reinhold Publishing Co.; New York, N. Y.; 1937) pages 560–562.

Chemical Abstracts 1940, page 4069.